United States Patent [19]
Evans et al.

[11] Patent Number: 5,485,779
[45] Date of Patent: Jan. 23, 1996

[54] DEVICE FOR SELECTIVELY PRESSURIZING OR EVACUATING A CHAMBER WITH AN OSCILLATING AIR SOURCE BY METERING AIR THROUGH A VALVE SYSTEM AND A DEVICE FOR DRAWING INTO, RETAINING AND EVACUATING MATERIAL FROM A CHAMBER

[76] Inventors: John P. Evans, 7814 Marion La., Bethesda, Md. 20814; Robert H. Evans, P.O. Box 191, Angelica, N.Y. 14709

[21] Appl. No.: 398,682

[22] Filed: Mar. 6, 1995

Related U.S. Application Data

[63] Continuation-in-part of Ser. No. 87,533, Jul. 8, 1993, Pat. No. 5,394,789.

[51] Int. Cl.⁶ .................. A47J 37/10; A47J 43/28
[52] U.S. Cl. .................. 99/345; 99/472; 99/484; 99/495; 141/22; 141/24; 141/26; 222/209; 222/400.8
[58] Field of Search .................. 99/345–347, 456, 99/472, 495, 484; 141/22–26, 65; 222/209, 401, 400.8; 220/231; 215/260, 262, 311

[56] References Cited

U.S. PATENT DOCUMENTS

| | | | |
|---|---|---|---|
| 947,468 | 1/1910 | Fish | 222/400.8 |
| 2,652,765 | 9/1953 | Risco | 99/345 |
| 2,669,176 | 2/1954 | Lazerus | 99/472 |
| 2,887,035 | 5/1959 | DeSeversky | 99/345 |
| 2,933,376 | 4/1960 | McBrien | 141/24 |
| 3,039,500 | 6/1962 | Goldberg | 141/26 |
| 3,323,689 | 6/1967 | Elmore | 222/209 |
| 4,043,341 | 8/1977 | Tromovitch | 222/209 |
| 4,129,066 | 12/1978 | Corley | 99/345 |
| 4,346,836 | 8/1982 | Nagel | 126/374 |
| 4,389,926 | 6/1983 | Joyner | 99/495 |
| 5,195,427 | 3/1993 | Germano | 99/472 |

Primary Examiner—Timothy F. Simone
Attorney, Agent, or Firm—Staas & Halsey

[57] ABSTRACT

A manually operable device for metering air through a valve system for drawing into, retaining and evacuating material from a chamber having a first air passageway operatively connected to the chamber and exposed to the atmosphere for transporting the material, a second air passageway operatively connected to the chamber, an oscillating air source for moving air within the second air passageway and a valve mechanism operatively connected to the second air passageway which when in a first position upon actuation of the oscillating air source moves air creating a partial vacuum within the chamber causing material to be drawn into the chamber, and when in a second position upon actuation of the oscillating air source causes air to be introduced under positive pressure into the chamber evacuating the material from the chamber into the first conveying mechanism and a third air passageway coupled to the valve assembly which allows the second air passageway to vent to the environment.

24 Claims, 6 Drawing Sheets

5,485,779

DEVICE FOR SELECTIVELY PRESSURIZING OR EVACUATING A CHAMBER WITH AN OSCILLATING AIR SOURCE BY METERING AIR THROUGH A VALVE SYSTEM AND A DEVICE FOR DRAWING INTO, RETAINING AND EVACUATING MATERIAL FROM A CHAMBER

This application is a Continuation in Part of U.S. patent application Ser. No. 08/087,533, filed Jul. 8, 1993, now U.S. Pat. No. 5,394,789.

BACKGROUND AND SUMMARY OF INVENTION

The present invention relates to a device for selectively pressurizing or evacuating a container with an oscillating air source and a device for selectively drawing into, retaining and evacuating material from a container.

For many years there has existed a need to collect and retain and/or to evacuate external substances to and from chambers with the use of a simple and inexpensive, metering device. Consistent with the broad principles of the present invention it is possible to control a "problematic fluid" via the ability to collect it from difficult-to-reach places, contain the fluid, and if desired, dispose of all or a portion thereof while observing, separating and adding to or removing some portion of the fluid. The expression "problematic fluid" is used herein to mean that some element or characteristic of the fluid, such as heat, causticity, grain or grit emulsion, acidity, bruisability, suspended composition or other problem, precludes using a pump to directly move the fluid.

With the present invention a simple device is employed which meters air through a valve system to create within a collection chamber either a partial vacuum or positive pressure, such that external objects and materials can be drawn into the chamber and collected therein, or in the alternative, expelled under pressure from the chamber. In this manner air movement, promoted by an oscillating air source, controls through a valve the flow of fluid into and out of the chamber of the container independently of the movement of the fluid. Consistent with the principles and scope of the present invention, the oscillating air source creates, alternatively, positive pressure or a partial vacuum in relation to ambient pressure. The present invention creates a partial vacuum in the reservoir causing the external objects and materials to enter the reservoir of the container, or in the alternative, creates a positive pressure in the reservoir causing external objects and material contained therein to be expelled to the atmosphere.

DESCRIPTION OF THE PREFERRED EMBODIMENTS

Figure 1:
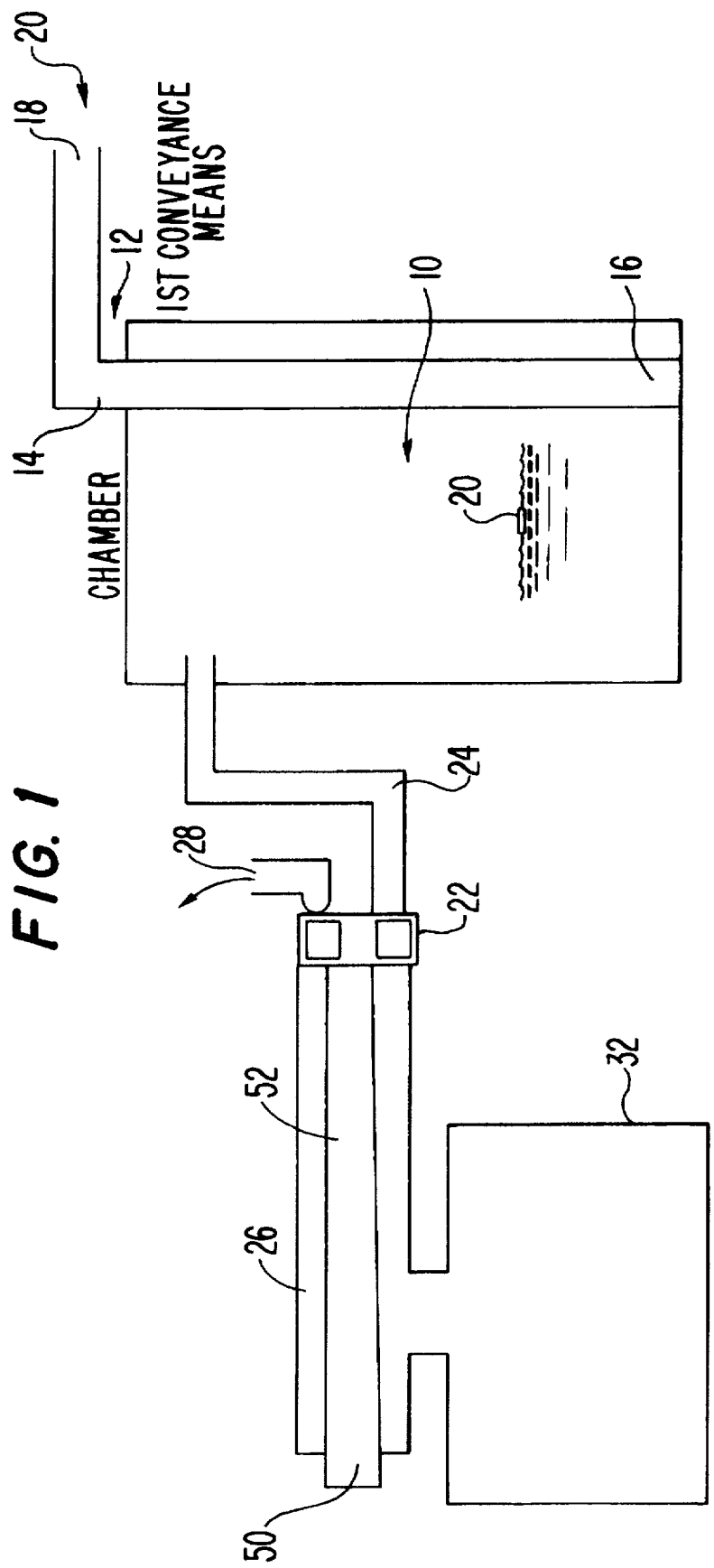
FIG. 1 is a schematic diagram illustrating the principles of the present invention.

There is schematically illustrated in FIG. 1 a chamber 10 provided with a first conveying system 12 consisting of a conduit 14 having one end 16 near the bottom of the chamber 10 and a second end 18 directly exposed to the atmosphere. As will be apparent hereinafter, in its broader aspects the present invention is designed to create a partial vacuum or increase the pressure of the chamber in order to withdraw materials and objects 20 into the end 18 of the pipe 14 and downwardly through the pipe 14 for discharge into the chamber 10 through end 16 or to retain the collected materials and objects 20 within the chamber 10 and, when desired, to expel the materials and objects 20 up the pipe 14 through the opening 18 to the atmosphere.

The reference numeral 22 designates generally a valve assembly which, as depicted, is arranged for rotational movement. The valve assembly 22 is provided with air passageways 24, 26 and 28, described hereinafter.

The reference numeral 26 designates generally a second air passageway in the form of conduit structure for transporting air. The reference numeral 32 designates an oscillating air source for moving air along the second air passageway 26.

The reference numerals 34 and 36 designate one-way valves within the valve assembly 22 operatively connecting the second air passageway 26 and the oscillating air source 32.

Figure 3A:
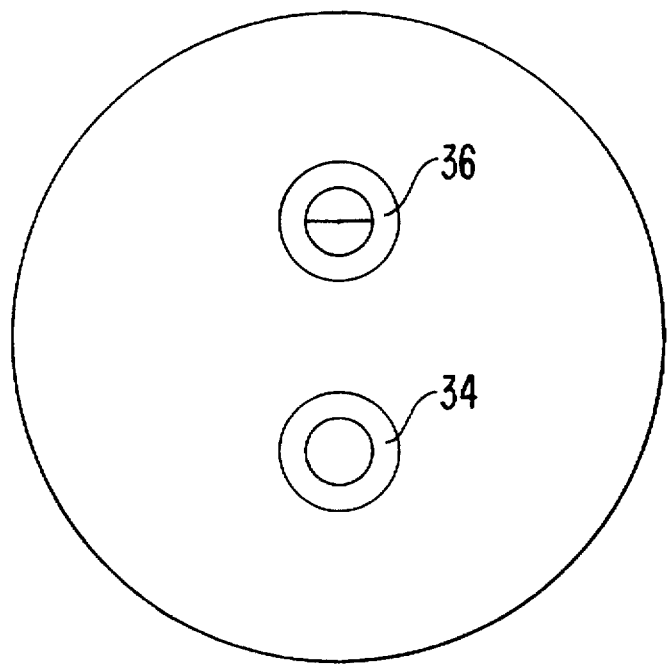
FIG. 3a is a schematic diagram illustrating the valve assembly in the first position.

When it is desired to collect materials or objects 20 and deposit same within the chamber 10, the valve assembly 22 is moved to the position illustrated in FIG. 3a. As oscillating air source 32 increases the pressure in second passageway 26 air is expelled outwardly therefrom through the one-way valve 36 into the third air passageway 28, through which the air is discharged to the atmosphere. The secondary action of the oscillating air source 32 then creates a partial vacuum in the second air passageway causing air to move through the one-way valve 34 creating a partial vacuum in the first air passageway 24 and the chamber 10, causing the materials and objects 20 to be drawn into the conduit 14 for deposit within the chamber 10.

Figure 3B:
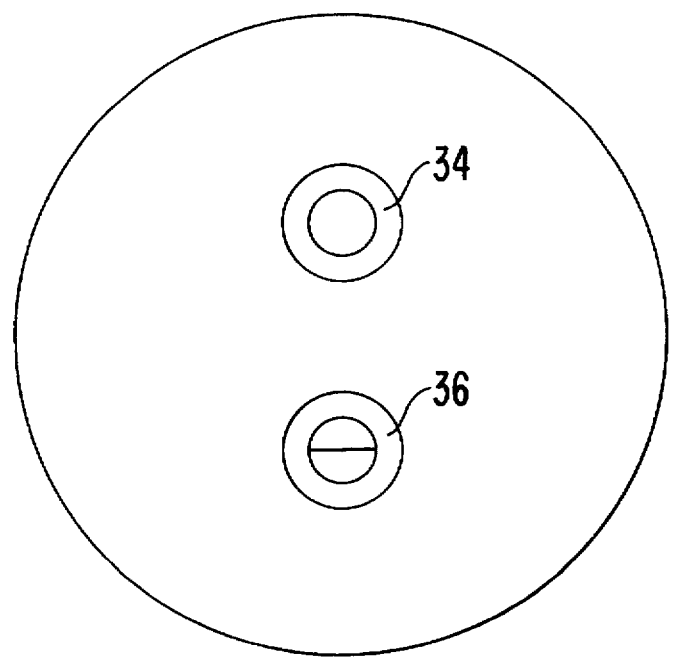
FIG. 3b is a schematic diagram illustrating the valve assembly in the second position.

When it is desired to propel the materials and objects 20 from the chamber 10 to the atmosphere, the position of the valve assembly 22 is reversed to the position shown in FIG. 3b, by rotation of handle 50 and stem 52. In this position, activation of the oscillating air source 32 causes air to be propelled through the one-way valve 36 into the first air passageway 24 and thereafter into the chamber 10. The air pressure then moves the materials and objects upwardly into and through the conduit 14, thus causing the materials and objects 20 to move out of the chamber 10 to the atmosphere. The secondary action of the oscillating air source 32 then creates a partial vacuum in the second air passageway 26 which is released by air entering through conduit 28 and valve 34.

Application of the principles of the present invention to a kitchen implement will now be described with reference to FIG. 2. The kitchen implement performs as a baster, skimmer, separator, cooler/stock container, a portable, hot-liquid dispenser and a transporter. All of these functions may be performed with a single, simple-to-use implement adapted particularly for use in extracting fat from food preparations, including basting fluids, skimming fat from soups or other hot mixtures, making fat-reduced gravy, when browning or parboiling meats, and the like. The kitchen implement featuring the present invention provides for splatter and dribble free collection, transportation, storage, or dispensation of hot and cold liquids in measured quantities and, also, can be used to collect, mix and dispense or serve liquids in the manner of gravy boats, salad dressing crucibles, creamers and the like.

Figure 2:
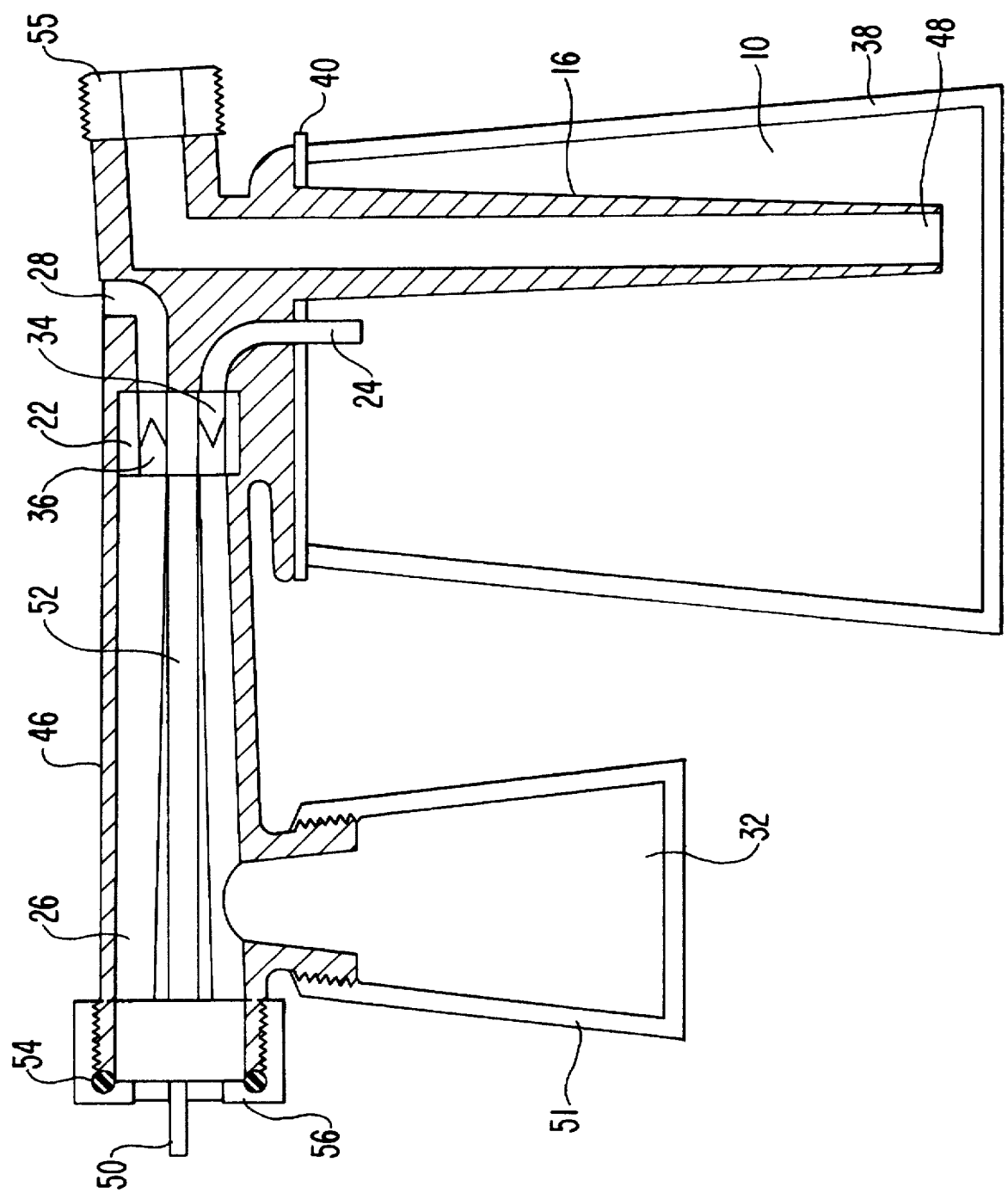
FIG. 2 is an elevational view, partly in section, illustrating a kitchen implement featuring the present invention.

As can be seen in FIG. 2, the chamber 10 is defined by a jar 38 suitably provided with a rotatably mounted cover 40. The conduit 16 is supported within a frame 46, which may also attached to the cover 40, such that one end 48 of the conduit is positioned near the bottom of the jar 38 while the other end 55 thereof is positioned to receive a distal extension piece (not shown).

The oscillating air source, generally designed by the reference numeral 32 in FIG. 2, includes an oscillating piston, a flexible bellows or the bulb-like member 51 (shown), which may be conveniently squeezed by the user. The oscillating air source may be driven manually, as shown, or by a mechanical, electrical or similar force. Bulb 51 is operatively connected to the second air passageway 26 within the frame 46. Valve assembly 22, handle 50 and stem 52 are sealed within the frame 46 by, for example, an end cap 56 which includes an air seal 54. In this way, the second air passageway 26 is connected to the first and third passageways 24, 28 through the valve assembly 22.

The structure of the valve assembly will now be discussed with reference to FIG. 3a, 3b, 4a, 4b, 5a, 5b, 5c, 5d, 6a, 6b, 6c and 6d. FIG. 3a is a schematic diagram of the valve assembly showing the positions of the one-way valves 36 and 34 for collecting materials or objects 20 and depositing same within the chamber 10. When the oscillating air supply mechanism, for example a bulb, contracts air is forced out of the second air passageway 26 through valve 36 to the atmosphere through third air passageway 28. When the bulb expands, valve 36 closes and valve 34 opens to allow air from the jar into the second air passageway 26 through the first air passageway. When it is desired to expel materials and objects 20 from the chamber 10 through conduit 16 to the atmosphere, the valve assembly is turned to the position shown in FIG. 3B. When the oscillating air supply, for example a bulb, contracts, air from the second air passageway 26 is forced through valve 36 through the first air passageway 24 and into the chamber 10. When the bulb expands, valve 36 closes and valve 34 opens to allow air to pass from the atmosphere to the second air passageway 26 via third air passageway 28.

Figure 4A:
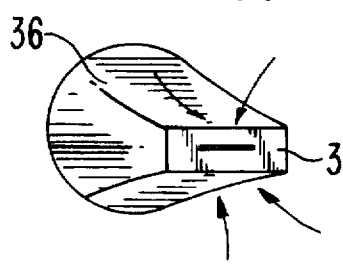
FIG. 4a is a perspective view of a one-way latex bladder valve in the closed position.
Figure 4B:
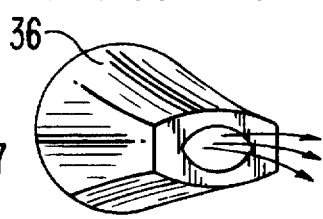
FIG. 4b is a perspective view of a one-way latex bladder valve in the open position.
Figure 4C:
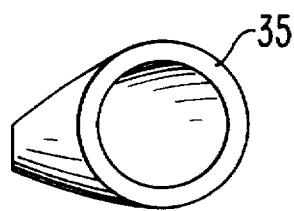
FIG. 4c is a perspective view of the rear side of a one-way latex bladder valve.

The one-way bladder valves are formed such that when the pressure on the rear side of the valve 35 exceeds the pressure on the front side of the valve 37, the valve opens to allow the air pressure to equalize. However, when the air pressure on the front side of the valve 37 exceeds the air pressure on the back side of the valve 35, the valve remains closed. The valve is closed when the pressures on the front side 37 and the rear side 35 are equal. FIG. 4a is a perspective view of the one-way bladder valve in the closed position. FIG. 4b is a perspective view of the one-way bladder valve in the open position. FIG. 4c is a perspective view of the rear side of the bladder valve.

Figure 5A:
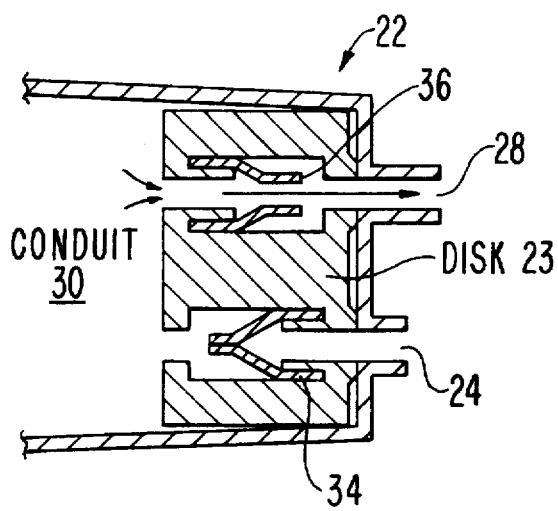
FIGS. 5a–5d are cross sectional views of a valve assembly using one-way latex bladder valves.
Figure 5C:
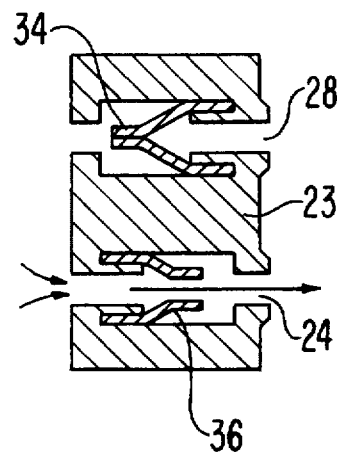
Figure 5B:
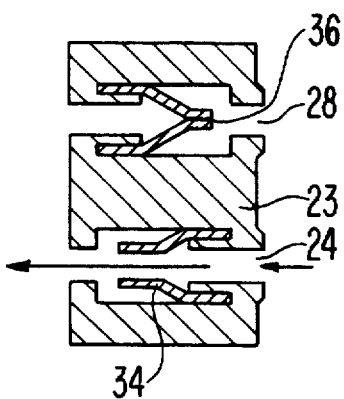

FIGS. 5a–5d show the valve assembly 22 which is received within frame 46. FIGS. 5a and 5b correspond to the valve positions shown in FIG. 3a. In FIGS. 5a and 5b, a bladder valve 36 is operatively connected with third air passageway 28 to allow air forced through valve 36 to the atmosphere. Valve 34 is operatively connected with the first air passageway 24 to allow air from the chamber 10 into the first air passageway 30. The valves 34, 36 are received within a rotational body 23 which is formed in the shape of a cylinder or a truncated cone to allow rotation within the frame 46.

Figure 5D:
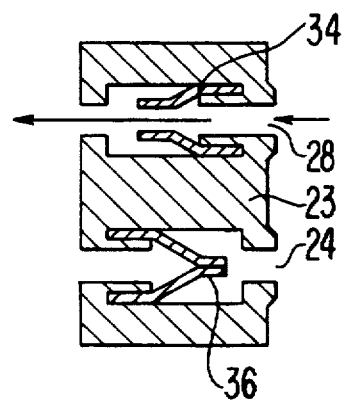
Figure 6A:
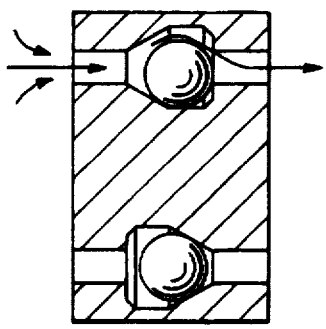
FIGS. 6a–6d are cross sectional views of the valve assembly using one-way ball bearing valves.
Figure 6C:
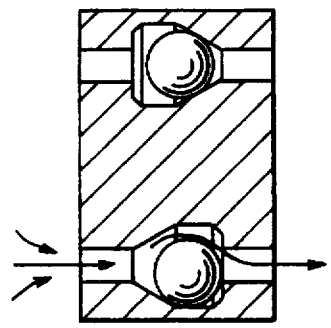
Figure 6B:
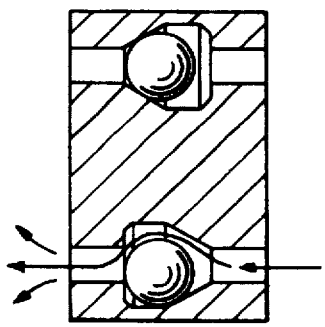
Figure 6D:
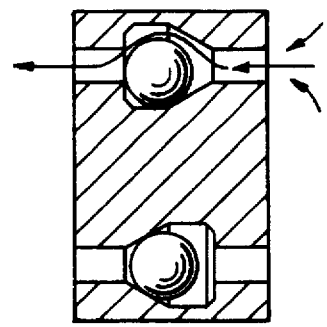

FIGS. 5c and 5d show the valve positions represented in FIG. 3b. In this position, one-way bladder valve 34 is operatively connected to third air passageway 28 to allow air in from the atmosphere and one-way bladder valve 36 is operatively connected to first air passageway 24 such that air is forced from the oscillating air source into the chamber 10, thus forcing materials or objects 20 from the chamber 10 to the atmosphere.

FIGS. 6a–6d are analogous to FIGS. 5a–5d; however, the one-way valves used are ball bearing valves rather than the bladder valves of FIGS. 5a–5d.

When it is desired to expel (possibly) fat-reduced material 20 from the jar 38 onto the food being cooked during the basting operation, the valve assembly 22 is moved to the position illustrated in FIG. 3B, from which it will be apparent that the oscillating air source 32, such as a piston, bulb or bellows expels air therefrom into second air passageway 26, after which the air is propelled into first air passageway 26 to pass into the reservoir of the jar 38. The air exerts pressure on the liquid 20 contained therein propelling same upwardly along the conduit 16 eventually leaving the end 50 of the conduit 16. During this operation, the oscillating air source 32 is connected to the atmosphere through the second and third air passageways 26 and 28.

When it is desired to move fatty material into the jar, the valve mechanism 22 is rotated to the opposite position (see FIG. 2), at which time the action of the oscillating air source 32, for example, depression of the bulb 51 causes air to enter and move along the second air passageway 26 entering the third air passageway 28 and outwardly to atmosphere. Subsequently, the expansion of the flexible bulb 51 draws a vacuum causing air within the second air passageway 26 to move into the bellows 51, in turn pulling a vacuum on the inside of the jar 38 through valve 34 and first air passageway 24. This action of creating a partial vacuum draws fatty substance 20 into the open end 50 of the tube 44 from which it moves downwardly and is deposited within the jar 38.

Figure 7:
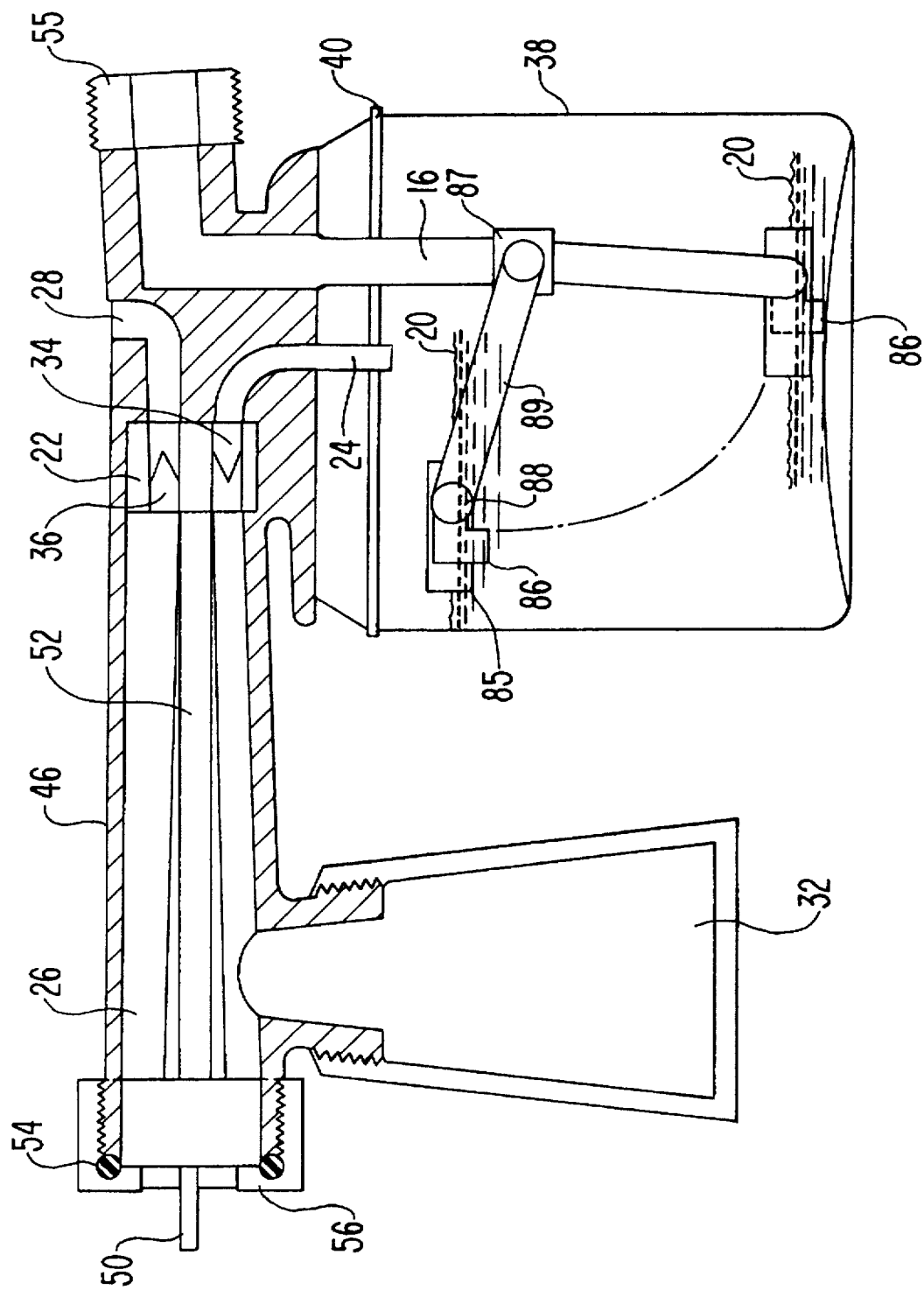
FIG. 7 is an elevational view, partly in section, of a second embodiment of a kitchen implement featuring the present invention.

The second embodiment of the present invention is illustrated in FIG. 7. In the course of dispersing material and objects 20 from the jar 38, there sometimes arises the need to expel material or objects that float to the top of the fluid in that they are the target or purpose for using the implement. To facilitate that end the first conveying means is provided with junction 87 midway in the conduit 16 inside the jar 38 mounted with a swing tube 89 jointed at both ends 88 to swivel up and down as the fluid level changes. The floating head 85 supports both the inlet tube 86 at the surface of the material and objects 20 and the swing tube 89 at the swing joint 88 thereby removing floating objects or lighter material from the top of fluid 20 from open end of inlet 86 through tube 89 to conduit 16 and out the open end 50 to atmosphere.

Although application of the present invention to a kitchen implement has been disclosed, it will be readily apparent that the principles of the present invention are equally applicable in collecting, retaining, mixing and dispensing a wide variety of materials in homes, garages, garden centers, shops, schools, laboratories, production facilities, and the like. Wherever fluids are used the present invention simplifies the ability to move, mix, collect and dispense a range of problematic, unstable or dangerous fluids.

While we have described a preferred embodiment of the present invention, it should be understood that various changes, adaptations and modifications will be made therein without departing from the spirit of the invention and the scope of the following claims.

We claim:

1. A device for selectively imbibing or expelling materials from a chamber comprising:

a chamber;

a conduit, for collecting or expelling materials, having a distal end exposed to the environment and a proximal end within said chamber;

a valve assembly including a first one-way valve and an oppositely oriented second valve;

a first air passageway coupling said chamber with a first side of the valve assembly;

a second air passageway coupled to a second side of the valve assembly;

an oscillating air source coupled to said second air passageway;

a third air passageway coupled with the first side of said valve assembly.

2. The device of claim 1, wherein the valve assembly is a two position, rotatable valve assembly.

3. The device of claim 1, wherein the first and second one-way valves are bladder valves.

4. The device of claim 3, wherein the bladder valves are latex.

5. The device of claim 1, wherein the first and second valves are ball bearing valves.

6. The device of claim 1, further comprising:

a threaded receptacle at the outlet end of the conduit for receiving one of a plurality of types of collection units.

7. The device of claim 1, wherein said oscillating air source is a flexible bulb.

8. The device of claim 1, wherein said oscillating air source is a bellows.

9. The device of claim 1, wherein said oscillating air source includes a reciprocating piston.

10. The device of claim 1, wherein said oscillating air source is manually driven.

11. The device of claim 1, wherein said oscillating air source is mechanically driven.

12. The device of claim 1, wherein said oscillating air source is electrically driven.

13. The device of claim 1, further comprising:

a pivot in the proximal portion of the conduit, located near the top of the proximal portion;

a float at the end of the proximal portion to allow the exposed end thereof to follow the level of the material within said chamber.

14. The device of claim 1 further comprising a handle, coupled to said valve mechanism, to rotate said valve mechanism.

15. A device to selectively evacuate or pressurize a chamber with the action of an oscillating air source, comprising:

a frame, for forming a seal with a chamber, having a sealed interior;

a valve assembly, received adjacent to and sealing the frame interior, including first and second oppositely aligned one-way valves;

an oscillating air source, alternately pressurizing and depressurizing the interior of said frame, such that when the valve assembly is in a first position pressurized air escapes through the first valve into the chamber and the depressurization is relieved by air entering the interior of the frame through the second valve from the atmosphere, and when the valve assembly is in a second position pressurized air escapes through the first valve to the atmosphere and the depressurization is relieved by air entering the interior of the frame through the second valve from the chamber.

16. The device of claim 15 wherein the valve assembly is rotatably received within said frame.

17. The device of claim 15 wherein the valve assembly is cylindrical.

18. The device of claim 15 further comprising a handle, coupled to said valve mechanism, to rotate said valve mechanism.

19. The device of claim 15, wherein said oscillating air source is a flexible bulb.

20. The device of claim 15, wherein said oscillating air source is a bellows.

21. The device of claim 15, wherein said oscillating air source includes a reciprocating piston.

22. The device of claim 15, wherein said oscillating air source is manually driven.

23. The device of claim 15, wherein said oscillating air source is mechanically driven.

24. The device of claim 15, wherein said oscillating air source is electrically driven.

* * * * *